(12) United States Patent
Hashimoto et al.

(10) Patent No.: US 7,208,899 B2
(45) Date of Patent: Apr. 24, 2007

(54) EMERGENCY-STOP DEVICE

(75) Inventors: Yoshiki Hashimoto, Hadano (JP);
Yoshikiyo Tanabe, Fujiyoshida (JP);
Nobuo Chino, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/385,998

(22) Filed: Mar. 22, 2006

(65) Prior Publication Data
US 2006/0214618 A1 Sep. 28, 2006

(30) Foreign Application Priority Data
Mar. 22, 2005 (JP) ............................. 2005-081817

(51) Int. Cl.
*G05B 19/406* (2006.01)
(52) U.S. Cl. .................... 318/563; 307/115; 361/115
(58) Field of Classification Search ............... 318/560, 318/563; 307/112–113, 115; 361/115
See application file for complete search history.

(56) References Cited

U.S. PATENT DOCUMENTS

| | | | |
|---|---|---|---|
| 4,653,003 A * | 3/1987 | Kirstein ....................... 701/29 |
| 6,051,894 A * | 4/2000 | Shimogama ................ 307/125 |
| 6,570,355 B2 * | 5/2003 | Morita et al. .............. 318/563 |
| 6,711,713 B1 | 3/2004 | Rumpler et al. |
| 6,734,581 B1 * | 5/2004 | Griffis ......................... 307/125 |
| 6,882,155 B2 * | 4/2005 | Lazzaro ...................... 324/418 |
| 7,133,747 B2 * | 11/2006 | Hashimoto et al. ......... 700/264 |

FOREIGN PATENT DOCUMENTS

EP  0336973 A1  10/1989
EP  1099519 A2  5/2001

* cited by examiner

*Primary Examiner*—Bentsu Ro
(74) *Attorney, Agent, or Firm*—Staas & Halsey LLP

(57) ABSTRACT

An emergency-stop device provided in a robot system, a machine tool or the like, arranged to promptly detect failure of a circuit through which an emergency stop signal is supplied to an CPU, without stopping the robot system, the machine tool or the like, to improve reliability. When at least one of emergency stop switches is opened, a CPU #1 or #2 issues an emergency stop command through one of input circuits, so that a switch SW10 or SW20 is opened by an output circuit #1 or #2 to emergency-stop the system. Switching means #1, #2 are opened separately, at appropriate intervals, and change of output of each photo coupler is recognized. In this manner, it is checked that open/closed-state outputs related to contacts C11 and C21/C12 and C22, each connected to one of the input circuits, indicate an open state. If regarding any of the contacts, change of output of the corresponding photo coupler is not recognized, the system is stopped and an action such as causing a buzzer and displaying of an alarm is taken.

8 Claims, 4 Drawing Sheets

EMERGENCY-STOP DEVICE

BACKGROUND OF THE INVENTION

1. Field of the Invention

The present invention relates to a device for emergency-stopping a servomotor provided in a robot system, a machine tool controlled by a numerical controller, etc.

2. Description of Related Art

An emergency-stop device including a CPU (central processing unit) is widely used in a robot system or a machine tool controlled by a numerical controller. In this connection, it is a known technique to dualize a emergency stop circuit, considering possible failure of the emergency stop circuit. FIG. 1 shows a typical example of a conventional device including dualized emergency stop circuit. As shown in this drawing, the device includes two CPU's #1, #2, which are connected to an emergency stop switch by separate emergency stop circuits.

When the normally-closed emergency stop switch is depressed, an emergency stop signal (indicating that a contact is open) is supplied to the CPU's #1, #2 through their respective input circuits (hereinafter referred to also as "emergency stop input circuits"). The CPU's #1, #2 always monitor the emergency stop signal (check whether or not the emergency stop signal is supplied, in every processing cycle). When the emergency stop signal is supplied, the CPU's #1, #2 open switches SW#1, SW#2 connected in series in a servo-amplifier power supply line to shut off supply of power to a servo amplifier, so that a servomotor (generally, a plurality of servomotors) M emergency-stops.

Here, it is arranged such that when one of the two parts constituting the dualized emergency stop circuit is out of order so that the emergency stop signal is supplied to the CPU #1 (or the CPU #2) but not supplied to the CPU #2 (or the CPU #1), the failure of the emergency stop circuit can be detected by the two CPU's #1, #2 comparing data. Also in this case, emergency stop is carried out since the switches SW1, SW2 are connected in series in the power supply line. When the failure is notified, a step such as prohibiting restart is normally taken to avoid a great danger which can be caused if also the other part of the dualized emergency stop circuit goes out of order afterwards.

Since switches used in the emergency stop circuit like this and relays for opening and closing them require high reliability, switches having a forcible switching mechanism and safety relays having a failure detection function are used. However, it is not enough to enhance the reliability of switches and relays, since the input circuit through which the emergency stop signal is supplied to the CPU uses semiconductor devices and the safety thereof is not ensured.

Even if the input circuit for one of the two CPU's goes out of order, when the emergency stop signal is supplied to the other CPU, it is recognized that the input circuit is in the off-state (not operative), from comparison of data by the two CPU's, and therefore the failure can be detected. However, in the case of a controller requiring long continuous operation, supply of an emergency stop input is rare and detection of failure cannot be carried out for a long time. In the case of a controller like this, even if it is dualized, there is a risk that the two input circuits go out of order successively, before failure is detected. Certainly, it is generally possible to stop the controller and check the input circuits. However, stopping the controller every time checking is performed is not desirable, since it lowers the working efficiency. There is no published document disclosing a technique for easily solving problems like this.

SUMMARY OF THE INVENTION

The present invention provides an emergency-stop device capable of promptly detecting failure of emergency-stop signal circuits without stopping power supply to a servomotor provided in a robot system or a machine tool etc. to enhance reliability.

The device of the present invention emergency-stops a servomotor by shutting off a power supply to the servomotor, using one or more signal systems for generating and transmitting emergency-stop signals. The device comprises: an emergency-stop switch and first and second emergency-stop signal circuits provided in each of the signal systems, the emergency-stop switch having two contacts included in the first and second emergency-stop signal circuits, respectively, to be manually opened and closed simultaneously; a processor for performing monitoring of open/closed states of the first and second emergency-stop signal circuits to issue a shut-off command to shut off the power supply to the servomotor when at least one of the first and second emergency-stop signal circuits indicates an open state; and first and second switching means provided in the first and second emergency-stop signal circuits, respectively, for opening/closing first and second common lines used in the signal systems for connection with a power source of the signal circuits, according to commands from the processor, wherein the processor performs checking of the first emergency-stop signal circuit by issuing an opening command to the first switching means when the first and second emergency-stop signal circuits are closed and thus electric power is supplied to the servomotor so as to confirm that the first emergency-stop signal circuit indicates an open state without issuing the shut-off command, and issues a closing command to the first switching means after the confirmation, while continuing monitoring of the open/closed state of the second emergency-stop signal circuit, and performs checking of the second emergency-stop signal circuit by issuing an opening command to the second switching means when the first and second emergency-stop signal circuits are closed and thus the electric power is supplied to the servomotor so as to confirm that the second emergency-stop signal circuit indicates an open state without issuing the shut-off command, and issues a closing command to the second switching means after the confirmation, while continuing monitoring of the open/closed state of the first emergency-stop signal circuit, the checking of the first and second emergency-stop signal circuits being performed alternatively and periodically.

First and second switches may be provided in series to correspond to the first and second emergency-stop signal circuits, respectively, in a power supply line for supplying the electric power to the servomotor, and the processor may issue the shut-off command to open the switch corresponding to the emergency-stop signal circuit in the open state in the monitoring of open/closed states of the first and second emergency-stop signal circuits.

The processor may issue the shut-off command to emergency-stop the servomotor when the open state of the emergency-stop signal circuit being in check is not confirmed in the checking of the first and second emergency-stop signal circuits.

The processor may issue an alarm when the open state of the emergency-stop signal circuit being in check is not confirmed in the checking of the first and second emergency-stop signal circuits.

First and second processors may be provided to be respectively associated with the first and second emergency-stop signal circuits, for performing the monitoring of the open/closed states and the checking of the first and second emergency-stop signal circuits, respectively.

First and second switches may be provided in series to correspond to the first and second emergency-stop signal circuits, respectively, in a power supply line for supplying the electric power to the servomotor, and the first and second processors may issue the shut-off command to open the switch corresponding to the emergency-stop signal circuit in the open state in the monitoring of open/closed states of the first and second emergency-stop signal circuits.

The first and second processors may issue the shut-off command to emergency-stop the servomotor when the open state of the emergency-stop signal circuit being in check is not confirmed in the checking of the first and second emergency-stop signal circuits.

The first and second processors may issue an alarm when the open state of the emergency-stop signal circuit being in check is not confirmed in the checking of the first and second emergency-stop signal circuits.

As stated above, according to the present invention, for the input circuit through which the emergency stop signal is supplied, a switching means for bringing the input circuit into the off-state is newly provided. By the CPU controlling this switching means, checking of the emergency stop input circuit can be carried out at any time. In the case of a device having a plurality of emergency-stop signal systems, by providing a switching means in a common line shared by input circuits belonging to the different emergency-stop signal systems, all the input circuits can be checked at once. By opening and closing the two switching means provided for the two parts constituting a dualized emergency stop circuit, separately (one at a time), the two parts of the dualized emergency stop circuit can be checked separately (one at a time).

Regarding the input circuit which is not under checking, an emergency stop input is effective. Hence, even if an emergency stop signal comes in during checking, the emergency stop function is effective.

From the present invention, the following beneficial effects which cannot be obtained by the conventional technique can be expected.

(1) Checking of the emergency-stop signal circuits can be carried out without stopping a driving system.

(2) By periodical monitoring, leaving failure undetected can be prevented and failure of an emergency-stop signal circuit can be detected with certainty.

(3) Emergency-stop signal circuits in a plurality of signal systems can be checked at once.

DETAILED DESCRIPTION

Figure 1:
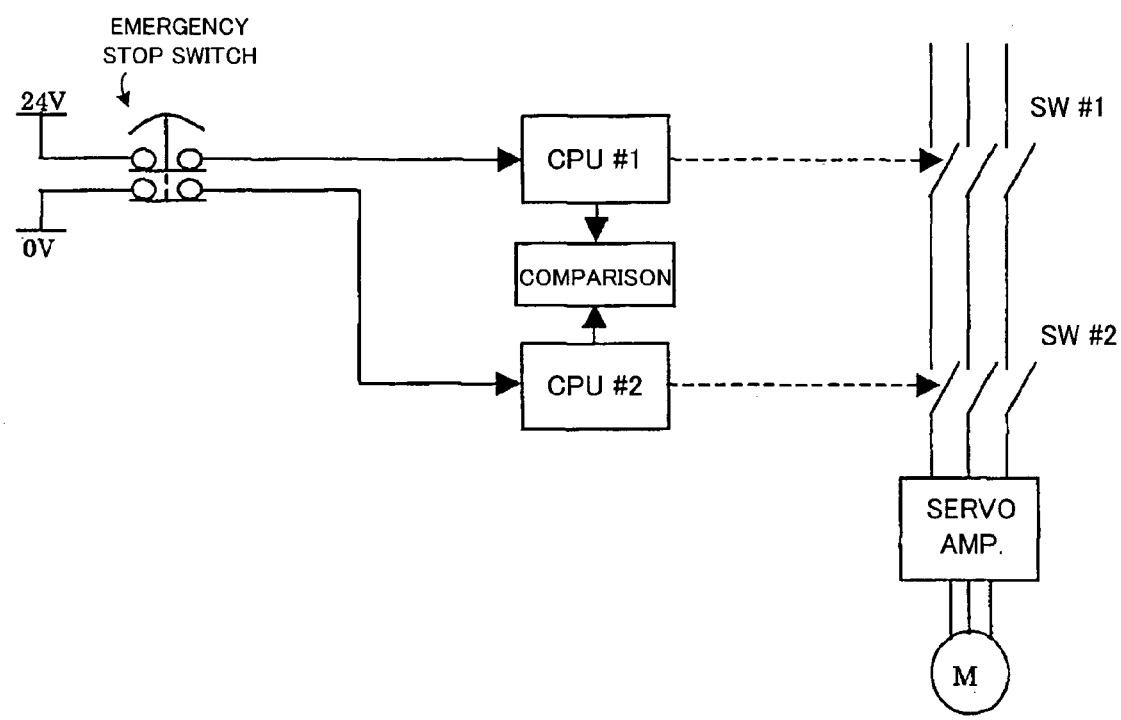
FIG. 1 is a diagram showing a typical example of a conventional device having a dualized emergency stop circuit including CPU's.
Figure 2:
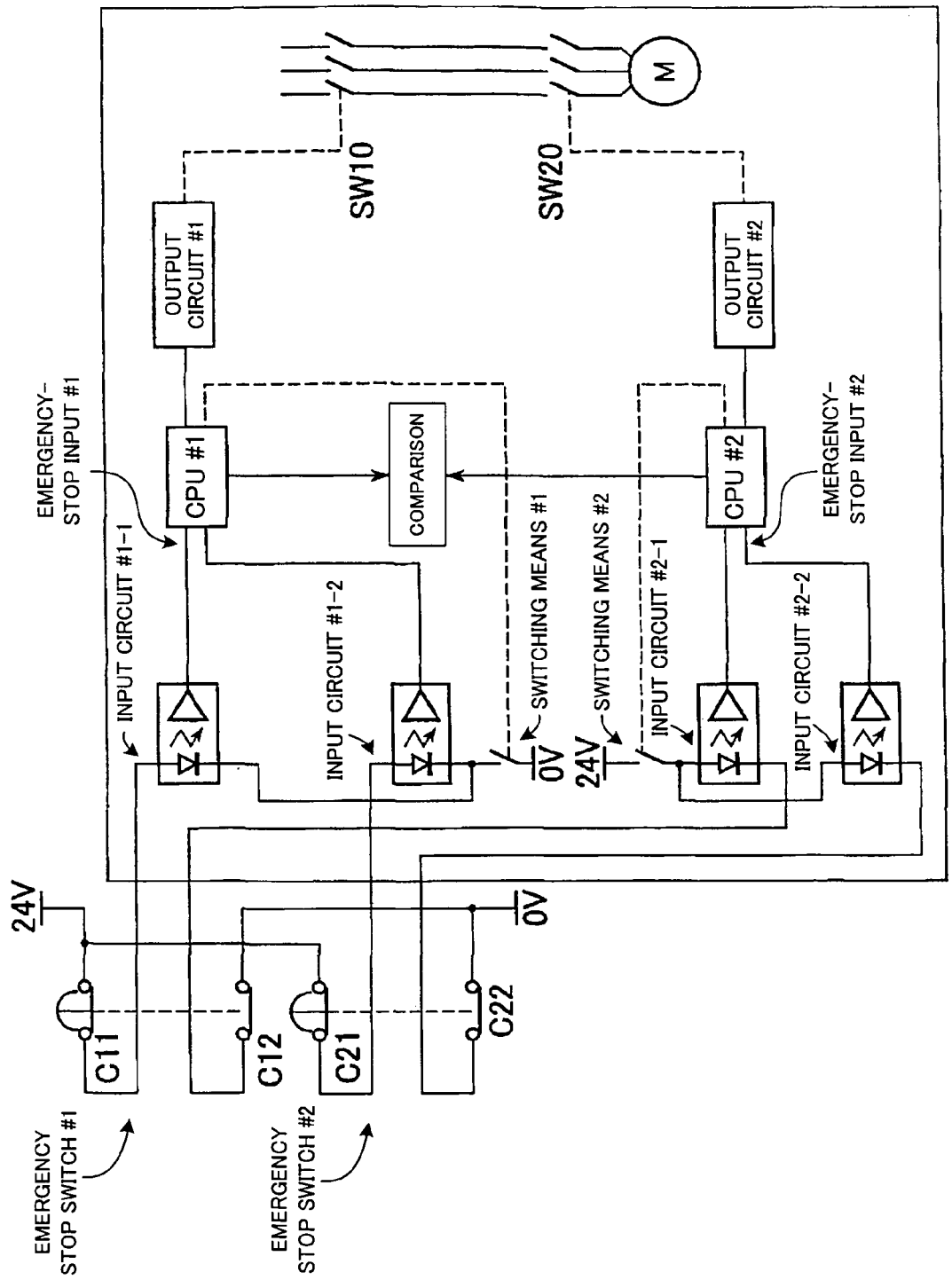
FIG. 2 is a diagram showing an example of schematic structure for a device adopting an emergency stop circuit in an embodiment of the present invention.

FIG. 2 shows an example of schematic structure for a device adopting a dualized emergency stop circuit in an embodiment of the invention. In this example of the device, the number of signal systems which generate and transmit an emergency stop signal is two, which is just an example and the number of signal systems can be one or more than two. As an input circuit through which the emergency stop signal comes in, one adopting a photo coupler is shown by way of example.

As shown in the same drawing, an emergency stop switch section comprises normally-closed emergency stop switches #1 and #2. The number of emergency stop switches corresponds to the number of signal systems (in this example, 2). Corresponding to dualization, the emergency stop switches #1, #2 each have two contacts (C11, C12 and C21, C22) opened and closed in phase, to which two emergency stop input circuits (referred to also simply as "input circuits") are connected, one-to-one.

Hence, this example has four emergency stop input circuits in total. Input circuits #1-1 and #1-2 belong to a first part, and input circuits #2-1 and #2-2 belong to a second part. Regarding dualization, the input circuit #1-1 (or #1-2) and the input circuit #2-1 (or #2-2) form duality.

Regarding connection, one C11 of the contacts of the emergency stop switch #1 connects a power source (24V) to an anode of the input circuit #1-1 using a photo coupler, when closed. An earth line connected to a cathode of the input circuit #1-1 can be connected to and disconnected from earth by a switching means #1. The switching means #1 is controlled by a CPU #1. The switching means #1 connects the earth line of the input circuit #1-1 to earth when closed, and disconnects it from earth when opened.

The switching means #1 performs the same earth-connecting/disconnecting function also for the input circuit #1-2 belonging to the same one of the two parts constituting the dualized emergency stop circuit (above-mentioned first part). Specifically, the switching means #1 connects an earth line of the input circuit #1-2 to earth when closed, and disconnects it from earth when opened.

The other contact C12 of the emergency stop switch #1 is opened and closed in phase with the contact C11. The contact C12 connects an earth line of the input circuit #2-1 using a photo coupler to earth when closed, and disconnects it from earth when opened.

One C21 of the contacts of the emergency stop switch #2 connects the emergency-stop-signal power source (24V) to an anode of the input circuit #1-2 using a photo coupler, when closed. As mentioned above, the earth line connected to the cathode of the input circuit #1-2 is connected to and disconnected from earth as the switching means #1 is closed and opened.

The other contact C22 of the emergency stop switch #2 is opened and closed in phase with the contact C21. The contact C22 connects an earth line connected to a cathode of the input circuit #2-2 using a photo coupler to earth when closed, and disconnects it from earth when opened. Respective anodes of the input circuits #2-1 and #2-2 each using a photo coupler (both belonging to the same one of the two parts constituting the dualized emergency stop circuit, namely the above-mentioned second part) can be connected to and disconnected from an emergency-stop-signal power source (24V) by a switching means #2. The switching means #2 is controlled by a CPU #2. The switching means #2 connects the input circuits #2-1 and #2-2 to the power source (24V) when closed, and disconnects them from the power source when opened.

Outputs of the input circuits #1-1 and #1-2 are supplied to the CPU #1, and outputs of the input circuits #2-1 and #2-2 are supplied to the CPU #2. Although each input circuit is represented as a photo coupler (including an LED and a photodetector), it is actually formed including an interfacial circuit in the CPU and a peripheral circuit for the LED/photodetector), in which, as generally known, various semiconductor devices, etc. are used. As already mentioned, these various semiconductor devices, etc. can go out of order. However, such failure can be promptly discovered by checking described later, while the device is kept operating.

Output circuits #1, #2 are connected to the CPU's #1, #2, respectively. Corresponding to dualization, the output circuits #1, #2 supply a control signal to two switches SW10, SW20 connected in series in a main power line which is a power supply line to a servo amplifier. If at least one of the CPU's #1, #2 supplies an emergency stop command, the corresponding output circuit(s) #1 and/or #2 opens the corresponding switch(es) SW10 and/or SW20 to shut off power supply to the servo amplifier to emergency-stop a servomotor (generally, a plurality of servomotors) M.

Figure 3:
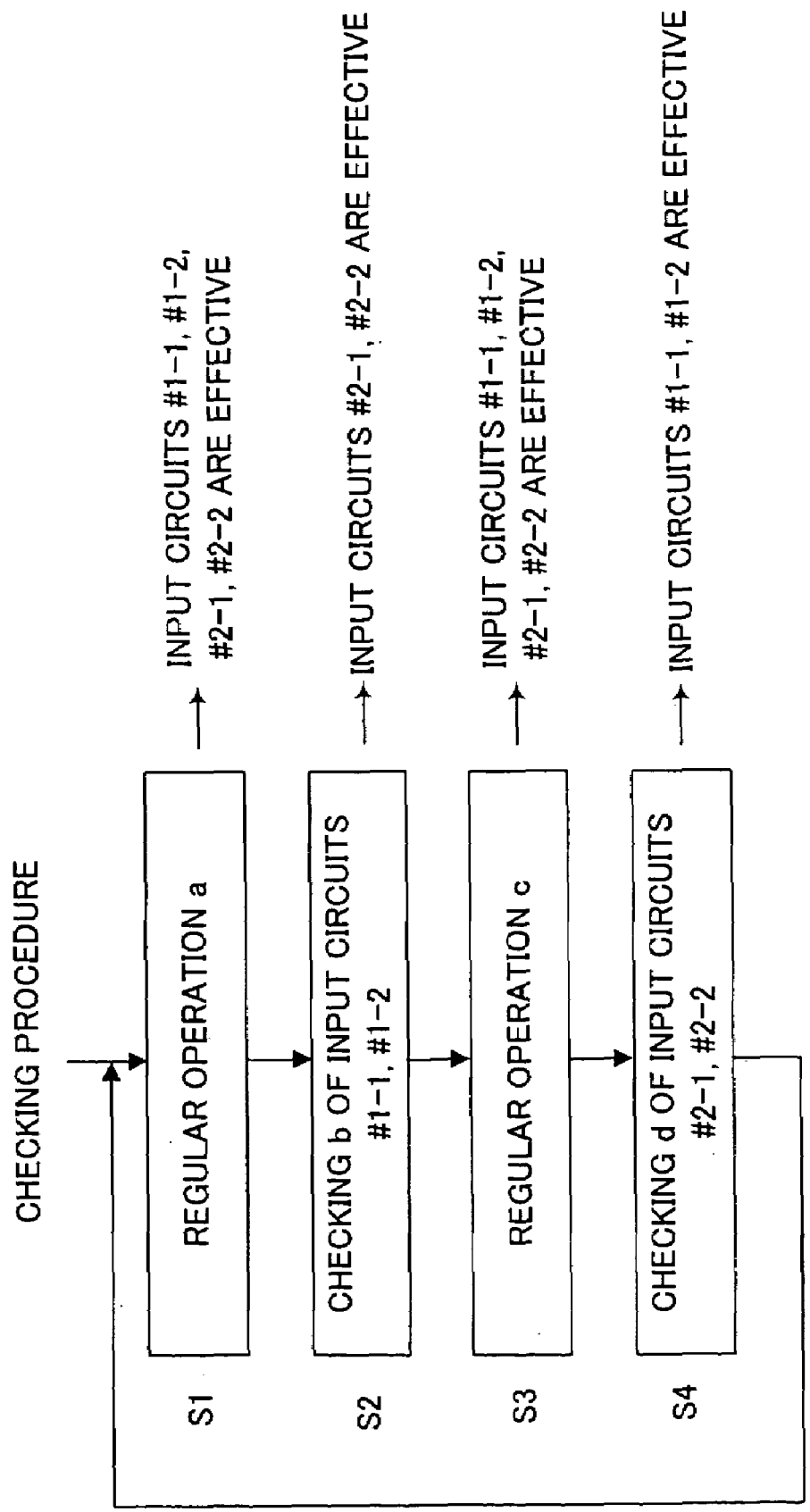
FIG. 3 is a flow chart showing a process of checking input circuits in the emergency stop circuit shown in FIG. 2.
Figure 4:
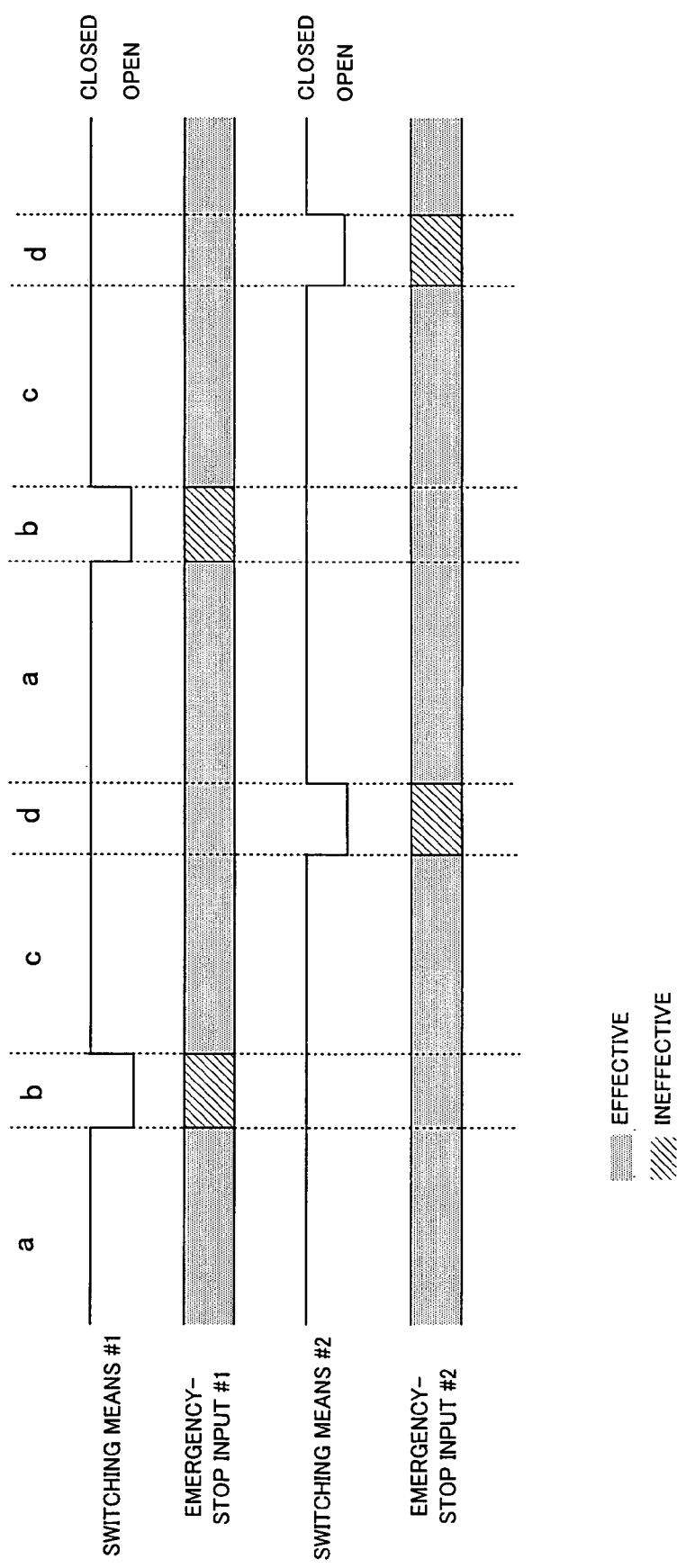
FIG. 4 is a time chart showing changes of open/closed states of switching means and effective/ineffective state of emergency-stop inputs corresponding thereto in checking of input circuits according to the process shown in FIG. 3.

Thus, in this embodiment, as a means for bringing the photo couplers in the input circuits into the off-state in an emergency, contacts are provided in a common line connecting the photo couplers and the power sources. By opening and closing the contacts or switching means of semiconductor, the photo couplers belonging to the two parts of the dualized emergency stop circuit are brought into the off-state at the same time. FIG. 3 shows the process of checking using this dualized emergency stop circuit. Further, FIG. 4 show changes of the open/closed states of the switching means #1 and #2 (the off-state and the on-state) and changes of effective/ineffective states of emergency-stop inputs #1 and #2 in this process of checking.

Suppose that now the device is operating with all emergency stops removed. Programs, parameters, etc. for performing the process are stored in appropriate memory in the system (not shown in the drawing; for example, memory in a robot control device, memory in a numerical controller of a machine tool) in advance.

[Step S1]

This is a stage in which the device is in regular operation (reference sign a). The input circuits #1-1, #1-2, #2-1, #2-2 are all effective. Naturally, the normally-closed emergency stop switches #1 and #2 are closed. This stage corresponds to a period indicated by reference sign a in the time chart of FIG. 4, in which period the switching means #1, #2 are placed in the closed state (represented by a high level) according to a command from the CPU's #1, #2. In this state, voltage of 24V is supplied to the respective anodes of the input circuits #1-1, #1-2, #2-1, #2-2, and the respective cathodes are connected to earth. Hence, the LED's of the photo couplers in the input circuits #1-1, #1-2, #2-1, #2-2 are on, and the photo couplers in the on-state are detected by the corresponding photodetectors.

The CPU #1 always monitors signals coming in through the input circuits #1-1 and #1-2 (checks them in every processing cycle of a very short specified period) and thereby monitors whether the contact C11 of the switch #1 and the contact C21 of the switch #2 are each open or closed. In other words, the CPU #1 monitors an open/closed-state output related to the contact C11 of the switch #1 and an open/closed-state output related to the contact C21 of the switch #2.

In this state (indicated by reference sign a in FIG. 4), unless at least one of the emergency stop switches #1, #2 is opened (normally by an operator in an emergency), the CPU #1 recognizes that the contacts C11 and C21 are both closed, and does not supply an emergency stop command to the output circuit #1.

Likewise, the CPU #2 always monitors signals coming in through the input circuits #2-1 and #2-2 (checks them in every processing cycle of a very short specified period) and thereby monitors whether the contact C12 of the switch #1 and the contact C22 of the switch #2 are each open or closed. In other words, the CPU #2 monitors an open/closed-state output related to the contact C12 of the switch #1 and an open/closed-state output related to the contact C22 of the switch #2.

In this state (indicated by reference sign a in FIG. 4), unless at least one of the emergency stop switches #1, #2 is opened (normally by an operator in an emergency), the CPU #2 recognizes that the contacts C12 and C22 are both closed, and does not supply an emergency stop command to the output circuit #2.

Consequently, in this state (indicated by reference sign a in FIG. 4), unless at least one of the emergency stop switches #1, #2 is opened, the switches SW1, SW20 are kept closed and the device does not emergency-stop.

However, if at least one of the emergency stop switches #1, #2 is opened so that at least one of the contacts C11, C12, C21, C22 is opened, the LED in at least one of the input circuits goes out (unless they are out of order) as specified below, and the device emergency-stops.

C11 is opened→LED in input circuit #1-1 goes out→switch SW10 is opened

C12 is opened→LED in input circuit #2-1 goes out→switch SW20 is opened

C21 is opened→LED in input circuit #1-2 goes out→switch SW10 is opened

C22 is opened→LED in input circuit #2-2 goes out→switch SW20 is opened

Thus, Step S1 is a stage in which the device keeps operating, in the state prepared for an emergency stop with the dualized emergency stop circuit for two signal systems. In this stage, checking of the input circuits is not performed. The device always transfers from Step S1 to Step S2 after a predetermined specified time (5 minutes, for example).

[Step S2]

In Step S2, the input circuits #1-1 and #1-2 are checked (reference sign b). This stage corresponds to a period indicated by reference sign b in the time chart of FIG. 4, in which period the switching means #1 is placed in the open state (represented by a low level) according to an opening command from the CPU #1. Meanwhile, the switching means #2 is kept in the closed state according to a closing command from the CPU #2. In this state, the input circuits #1-1 and #1-2 are under checking, and an emergency-stop input #1 is made ineffective. The input circuits #2-1 and #2-2 are in the same state as in Step S1, and an emergency-stop input #2 is kept effective.

Thus, if at least one of the emergency stop switches #1, #2 is opened so that at least one of the contacts C12, C22 is opened, the LED in at least one of the input circuits #2-1, #2-2 goes out (unless they are out of order), and the device emergency-stops.

Regarding the input circuits #1-1, #1-2, unless they are out of order, their respective LED's go out immediately after the switching means #1 is opened, irrespective of whether the emergency stop switches #1, #2 are open or closed. The CPU #1 recognizes this change of state of the LED's, and from this, recognizes that the input circuits #1-1, #1-2 are in order (namely, that when power supply to these LED's is shut off, signals each indicating that the corresponding photo coupler is off are supplied to the CPU #1). In this manner, the CPU #1 checks that the open/closed-state outputs related to the contacts C11 and C21 connected to the input circuits #1-1, #1-2 indicate an open state.

When the CPU #1 recognizes the above signals (each indicating that the corresponding photo coupler is off), the CPU #1 does not supply an emergency stop command to the output circuit #1. When the CPU #1 does not recognize them, the CPU #1 determines that the corresponding input circuits are out of order, and emergency-stops the device. More specifically, when the CPU does not recognize the above signal regarding at least one of the input circuits #1-1, #1-2, the CPU #1 supplies an emergency stop command to the output circuit #1 to open the switch SW10, and generates an alarm output to cause a buzzer and an alarm display device (for example, a display attached to a robot control device or a numerical controller of a machine tool) to operate in a known manner, to give information for identifying the input circuit that is out of order, etc.

When the CPU #1 does not supply an emergency stop command and the CPU #2 obtains the monitoring result that the contacts C12, C22 are both closed (the photo couplers in the input circuits #2-1, #2-2 are on), the device goes on to Step S3. If the CPU #2 obtains the monitoring result that at least one of the contacts C12, C22 is open, the device naturally emergency-stops.

[Step S3]

Like Step S1, Step S3 is a stage in which the device is in regular operation (reference sign c). The input circuits #1-1, #1-2, #2-1, #2-2 are all effective. As described in respect of Step S1, the switching means #1, #2 are placed in the closed state (represented by a high level) according to a command from the CPU's #1, #2, and the LED's of the photo couplers in the input circuits #1-1, #1-2, #2-1, #2-2 are on, and the photo couplers in the on-state are detected by the corresponding photodetectors.

The CPU's #1, #2 always monitor signals coming in through the input circuits #1-1 and #1-2, or through the input circuits #2-1 and #2-2 (checks them in every processing cycle of a very short specified period) and thereby monitors whether each of the contacts C11, C21, C12, C22 is open or closed.

For the same reason as the above, in this state (indicated by reference sign c in FIG. 4), unless at least one of the emergency stop switches #1, #2 is opened (normally by an operator in an emergency), neither of the CPU's #1, #2 supplies an emergency stop command, and the system continues operating. If at least one of the emergency stop switches #1, #2 is opened so that at least one of the contacts C11, C12, C21, C22 is opened, the LED in at least one of the input circuits goes out (unless they are out of order), and the device emergency-stops.

The device always transfers from Step S3 to Step S4 after a predetermined specified time (5 minutes, for example).

[Step S4]

In Step S4, the input circuits #2-1 and #2-2 are checked (reference sign d). This stage corresponds to a period indicated by reference sign d in the time chart of FIG. 4, in which period the switching means #2 is placed in the open state (represented by a low level) according to an opening command from the CPU #2. Meanwhile, the switching means #1 is closed according to a closing command from the CPU #1. In this state, the input circuits #2-1 and #2-2 are under checking, and the emergency-stop input #2 is made ineffective. The input circuits #1-1 and #1-2 are in the same state as in Step S1 or S3, and the emergency-stop input #1 is kept effective.

Thus, if at least one of the emergency stop switches #1, #2 is opened so that at least one of the contacts C11, C21 is opened, the LED in at least one of the input circuits #1-1, #1-2 goes out (unless they are out of order), and the device emergency-stops.

Regarding the input circuits #2-1, #2-2, unless they are out of order, their respective LED's go out immediately after the switching means #2 is opened, irrespective of whether the emergency stop switches #1, #2 are open or closed. The CPU #2 recognizes this change of state of the LED's, and from this, recognizes that the input circuits #2-1, #2-2 are in order (namely, that when power supply to these LED's is shut off, signals each indicating that the corresponding photo coupler is off are supplied to the CPU #2). In this manner, the CPU #2 checks that the open/closed-state outputs related to the contacts C12 and C22 connected to the input circuits #2-1, #2-2 indicate an open state.

When the CPU #2 recognizes the above signals (each indicating that the corresponding photo coupler is off), the CPU #2 does not supply an emergency stop command to the output circuit #2. When the CPU #2 does not recognize them, the CPU #2 determines that the corresponding input circuits are out of order, and emergency-stops the device. More specifically, when the CPU #2 does not recognize the above signal regarding at least one of the input circuits #2-1, #2-2, the CPU #2 supplies an emergency stop command to the output circuit #2 to open the switch SW20, and generates an alarm output to cause a buzzer and an alarm display device (for example, a display attached to a robot control device or a numerical controller of a machine tool) to operate in a known manner, to give information for identifying the input circuit that is out of order, etc.

When the CPU #2 does not supply an emergency stop command and the CPU #1 obtains the monitoring result that the contacts C11, C21 are both closed (the photo couplers in the input circuits #1-1, #1-2 are on), the device returns to Step S1. If the CPU #1 obtains the monitoring result that at least one of the contacts C11, C21 is open, the device naturally emergency-stops.

By repeating the series Step S1→Step S2→Step S3→Step S4→Step S1→Step S2 . . . , checking of the input circuits can be performed, without stopping the device, keeping the advantage of dualization, and if any of the input circuits goes out of order, the failure is discovered when Step S2 or Step S4 is first performed after the failure happens, so that appropriate measures can be taken immediately to ensure safety. Although in the described example, checking of the input circuits #1-1, #1-2 (step S2) and checking of the input circuits #2-1 and #2-2 (step S4) are carried out alternately, the checkings do not necessarily have to be performed alternately. They only needs to be performed separately (one at a time). Further, as shown in FIG. 4, while one of the emergency-stop inputs is made ineffective, the other emergency-stop input is kept effective. Hence, checking according to the present invention does not prevent detection of the emergency stop input.

In order to prevent the emergency-stop-signal input circuits belonging to the two parts constituting the dualized emergency stop circuit from going out of order at the same time, it is desirable that they are formed as separate components. Specifically, in the example shown in FIG. 2, it is desirable that the input circuits #1-1 and #2-1 be formed as separates components and the input circuits #1-2 and #2-2 be formed as separate components.

Further, in order not to leave failure undetected but to detect it with certainty, it is desirable to perform checking of the input circuits at intervals sufficiently shorter than the period of time between the time when a component of the input circuit goes out of order and the next time when another component thereof goes out of order.

What is claimed is:

1. A device for emergency-stopping a servomotor by shutting off a power supply to the servomotor, using one or more signal systems for generating and transmitting emergency-stop signals, comprising:
an emergency-stop switch and first and second emergency-stop signal circuits provided in each of the signal systems, said emergency-stop switch having two contacts included in said first and second emergency-stop signal circuits, respectively, to be manually opened and closed simultaneously;
a processor for performing monitoring of open/closed states of said first and second emergency-stop signal circuits to issue a shut-off command to shut off the power supply to the servomotor when at least one of said first and second emergency-stop signal circuits indicates an open state; and
first and second switching means provided in said first and second emergency-stop signal circuits, respectively, for opening/closing first and second common lines used in the signal systems for connection with a power source of the signal circuits, according to commands from said processor,
wherein said processor performs checking of the first emergency-stop signal circuit by issuing an opening command to said first switching means when said first and second emergency-stop signal circuits are closed and thus electric power is supplied to the servomotor so as to confirm that said first emergency-stop signal circuit indicates an open state without issuing the shut-off command, and issues a closing command to said first switching means after the confirmation, while continuing monitoring of the open/closed state of the second emergency-stop signal circuit, and
performs checking of the second emergency-stop signal circuit by issuing an opening command to said second switching means when said first and second emergency-stop signal circuits are closed and thus electric power is supplied to the servomotor so as to confirm that said second emergency-stop signal circuit indicates an open state without issuing the shut-off command, and issues a closing command to said second switching means after the confirmation, while continuing monitoring of the open/closed state of the first emergency-stop signal circuit,
the checking of said first and second emergency-stop signal circuits being performed alternatively and periodically.

2. A device for emergency-stopping a servomotor according to claim 1, wherein first and second switches are provided in series to correspond to said first and second emergency-stop signal circuits, respectively, in a power supply line for supplying the electric power to the servomotor, and said processor issues the shut-off command to open the switch corresponding to the emergency-stop signal circuit in the open state in the monitoring of open/closed states of said first and second emergency-stop signal circuits.

3. A device for emergency-stopping a servomotor according to claim 1, wherein said processor issues the shut-off command to emergency-stop the servomotor when the open state of the emergency-stop signal circuit being in check is not confirmed in the checking of said first and second emergency-stop signal circuits.

4. A device for emergency-stopping a servomotor according to claim 1, wherein said processor issues an alarm when the open state of the emergency-stop signal circuit being in check is not confirmed in the checking of said first and second emergency-stop signal circuits.

5. A device for emergency-stopping a servomotor according to claim 1, wherein first and second processors are provided to be respectively associated with said first and second emergency-stop signal circuits, for performing the monitoring of the open/closed states and the checking of the first and second emergency-stop signal circuits, respectively.

6. A device for emergency-stopping a servomotor according to claim 5, wherein first and second switches are provided in series to correspond to said first and second emergency-stop signal circuits, respectively, in a power supply line for supplying the electric power to the servomotor, and said first and second processors issue the shut-off command to open the switch corresponding to the emergency-stop signal circuit in the open state in the monitoring of open/closed states of said first and second emergency-stop signal circuits.

7. A device for emergency-stopping a servomotor according to claim 5, wherein said first and second processors issue the shut-off command to emergency-stop the servomotor when the open state of the emergency-stop signal circuit being in check is not confirmed in the checking of said first and second emergency-stop signal circuits.

8. A device for emergency-stopping a servomotor according to claim 5, wherein said first and second processors issue an alarm when the open state of the emergency-stop signal circuit being in check is not confirmed in the checking of said first and second emergency-stop signal circuits.

* * * * *